(12) United States Patent
Gupta

(10) Patent No.: US 6,204,858 B1
(45) Date of Patent: *Mar. 20, 2001

(54) SYSTEM AND METHOD FOR ADJUSTING COLOR DATA OF PIXELS IN A DIGITAL IMAGE

(75) Inventor: Naresh C. Gupta, Noida (IN)

(73) Assignee: Adobe Systems Incorporated, San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/866,093

(22) Filed: May 30, 1997

(51) Int. Cl.[7] .................................................. G06T 17/00
(52) U.S. Cl. .......................................... 345/431; 382/167
(58) Field of Search ............................ 345/431; 382/163, 382/167; 358/518, 519, 520, 521, 523

(56) References Cited

U.S. PATENT DOCUMENTS

| | | | |
|---|---|---|---|
| 5,130,789 | 7/1992 | Dobbs et al. ........................... 358/75 |
| 5,202,935 | 4/1993 | Kanamori et al. ..................... 382/54 |
| 5,270,806 | * 12/1993 | Venable et al. ....................... 345/431 |
| 5,398,308 | * 3/1995 | Kato et al. ............................ 345/431 |
| 5,432,863 | * 7/1995 | Benati et al. ......................... 382/167 |
| 5,506,946 | * 4/1996 | Bar et al. .............................. 345/431 |
| 5,701,519 | * 12/1997 | Fukuhara et al. ..................... 396/48 |
| 5,706,355 | * 1/1998 | Raboisson et al. ................... 382/104 |
| 5,796,931 | * 8/1998 | Sugiyama ............................. 345/431 |

FOREIGN PATENT DOCUMENTS 0 635 972 A2   1/1995   (EP) .
0 693 852 A2   1/1996   (EP) .

* cited by examiner

*Primary Examiner*—Mark Zimmerman
*Assistant Examiner*—HueDung X. Cao
(74) *Attorney, Agent, or Firm*—Fish & Richardson, P.C.

(57) ABSTRACT

Color data of pixels of a digital image are adjusted by identifying pixels of a digital image having original color data corresponding to predetermined color and shape characteristics and adjusting the original color data of the identified pixels to achieve a desired result.

22 Claims, 6 Drawing Sheets

SYSTEM AND METHOD FOR ADJUSTING COLOR DATA OF PIXELS IN A DIGITAL IMAGE

BACKGROUND

The invention relates to adjusting color in digital images.

A digital image is a raster of rows and columns of picture elements, or "pixels", each of which include information such as color data. Color data describes the pixel color using any of a variety of color systems. For example, in the RGB (red-green-blue) system, colors are represented as a combination of red, green, and blue components. Color data for a pixel thus includes numerical values reflecting the intensities of the red, green, and blue components of the pixel color. Other color systems include CMYK (cyan-magenta-yellow-key) and HSV (hue-saturation-value), which similarly represent colors as combinations of their respective color components.

Applications exist that allow a user to adjust the color of a digital image. In some applications, the user can manually adjust the color of a pixel by methods such as replacing the existing color data with the desired color data, enhancing or reducing a specified color component, or mixing the existing color data with color data for another color. However, it can be a time consuming process for the user to identify specific pixels and to adjust the color data of those pixels until the desired color is achieved.

SUMMARY

In general, in one aspect, the invention features a computer-implemented method to adjust color data of pixels of a digital image by identifying pixels of a digital image having original color data corresponding to predetermined color and shape characteristics and adjusting the original color data of the identified pixels to achieve a desired result.

Certain implementations of the invention may include one or more of the following features. The method includes defining a portion of a digital image in response to user input, where the identification of pixels identifies only pixels of the digital image within the user-defined portion.

Identifying pixels of a digital image having original color data corresponding to predetermined color and shape characteristics filters the digital image based on predetermined color characteristics and using filters corresponding to predetermined shape characteristics. Pixels of the digital image having original color data corresponding to predetermined color and shape characteristics are identified by creating color enhanced data for the pixels of the digital image based on the original color data, and filtering the color enhanced data for the digital image based on predetermined color characteristics and using filters corresponding to predetermined shape characteristics. The digital image may be filtered by convolving color data of the pixels of the digital image with the filters.

The method includes verifying that the identified pixels actually correspond to predetermined color and shape characteristics, based on user input.

The predetermined color and shape characteristics correspond to a red eye effect. The identified pixels correspond to a portion of an eye in the digital image, and adjusting the original color data of the identified pixels determines an iris color, reduces a red component in the original color data of the identified pixels, and modifies the original color data towards achieving the iris color. Determining the iris color includes identifying pixels of the digital image corresponding to an iris area of an eye affected by the red eye effect, and evaluating the color data of the iris pixels to determine the iris color. Determining the iris color may alternatively use a default color, which may be selected by a user.

In general, in another aspect, the invention enables use of the computer-implemented method using a memory device storing computer-readable instructions for aiding a computer to adjust color data of pixels of a digital image.

In general, in another aspect, the invention provides an apparatus to adjust color data of pixels of a digital image, comprising a storage medium to store a digital image and a processor operatively coupled to the storage medium and configured to perform the computer-implemented method.

Among the advantages of the invention are one or more of the following. The invention identifies pixels of color images to be adjusted for the user. The invention automatically adjusts the color data of identified pixels.

Other features and advantages of the invention will become apparent from the following description and from the claims.

DESCRIPTION

Figure 1:
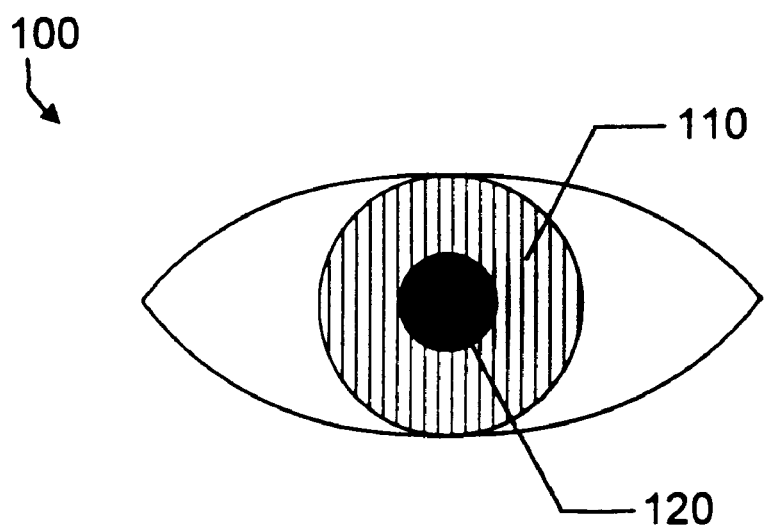
FIG. 1 is an illustration of an eye.
Figure 2:
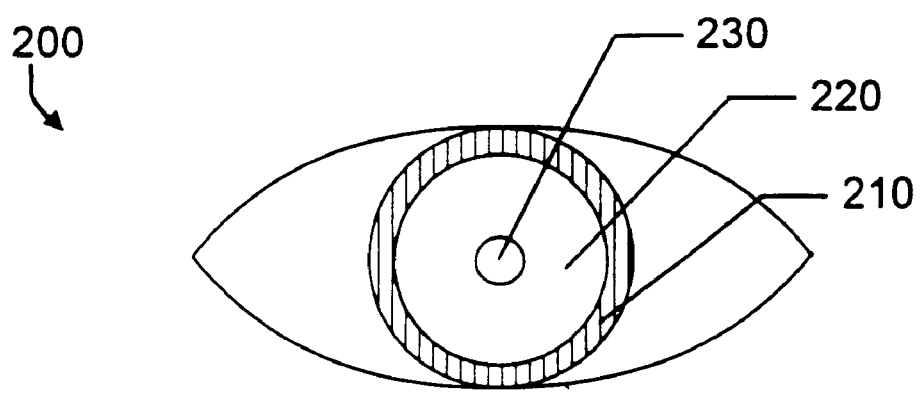
FIG. 2 is an illustration of the red eye effect on an eye.

Automatic color adjustment in digital images is desirable in some situations. For example, automatic color adjustment may be desired to adjust recurring and identifiable photographic discolorations. An example of such a discoloration is the "red eye" effect that often occurs in photographs. FIG. 1 illustrates the natural coloring of an eye 100, having a colored iris 110 and a blackish pupil 120. FIG. 2 illustrates an eye 200 with the red eye effect, in which a red circular shape 220 at least partially (and sometimes completely) obscures the iris 210 and typically obscures the entire pupil 120 (FIG. 1). A small white circular glare 230 often appears in the center of the red eye portion 220.

Occurrences of the red eye effect share these common features and thus are identifiable by a red circular area 220, frequently having a white center 230 and surrounded by a non-red background 210. In some cases, the non-red background 210 may be a ring of the iris color as shown in FIG. 2; in other cases, if the red circular area 220 obscures the entire iris, the non-red background 210 may be the whites of the eye. The invention provides a method for automatically detecting and adjusting the color of such identifiable effects.

The invention may be implemented in special purpose hardware, software applications running on general purpose hardware, or a combination of both. Preferably, the invention is implemented in a software application executing in a computer system. For example, the invention may be implemented as a feature in image processing applications such as the PhotoDeluxe® computer program, available from Adobe Systems Incorporated of San Jose, Calif.

Figure 3:
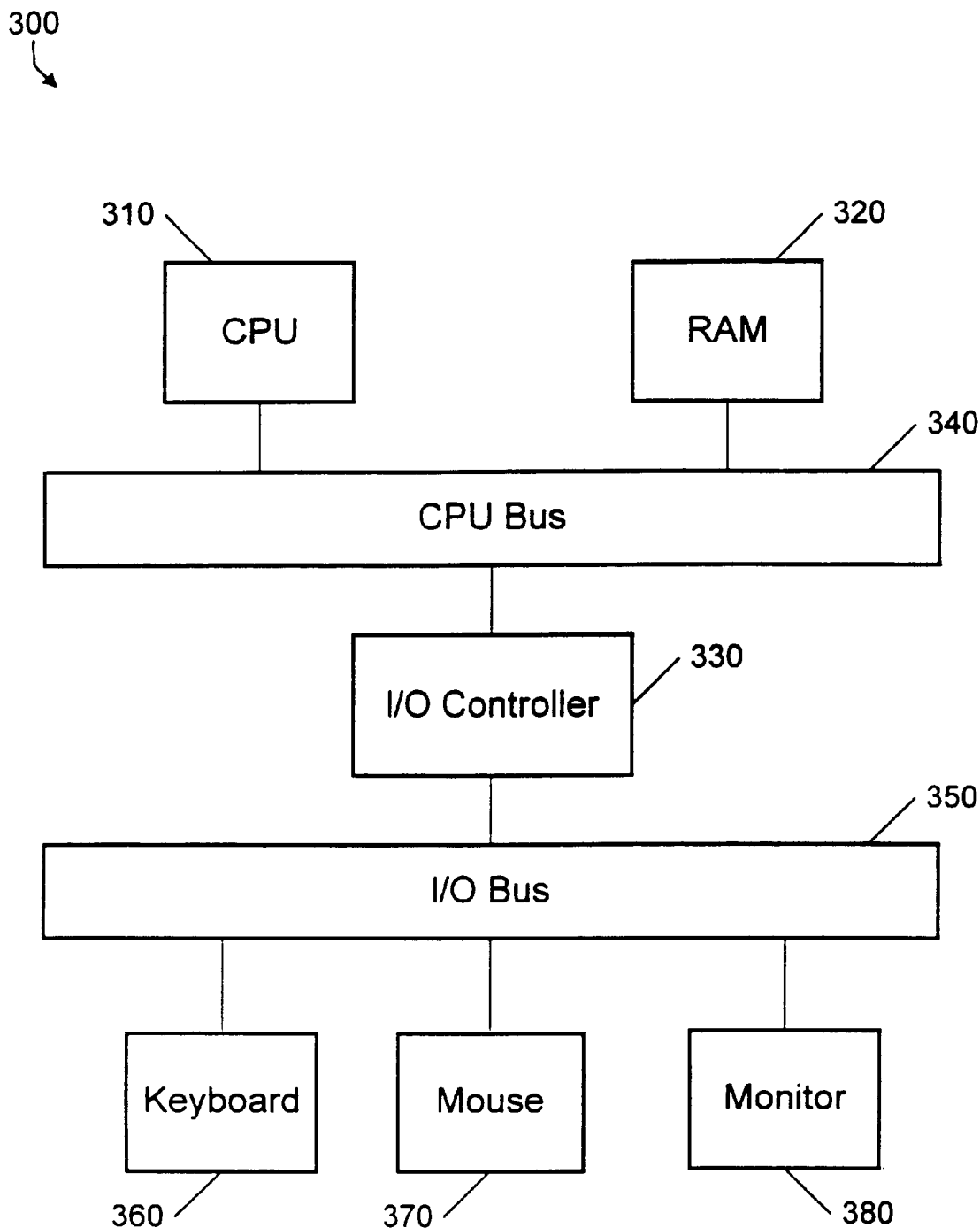
FIG. 3 illustrates a computer system suitable for use with the present invention.

FIG. 3 illustrates an appropriate computer system 300, including a CPU 310, a RAM 320, and an I/O controller 330 coupled by a CPU bus 340. The I/O controller 330 is also coupled by an I/O bus 350 to input devices such as a keyboard 360 and a mouse 370, and output devices such as a monitor 380.

Figure 4:
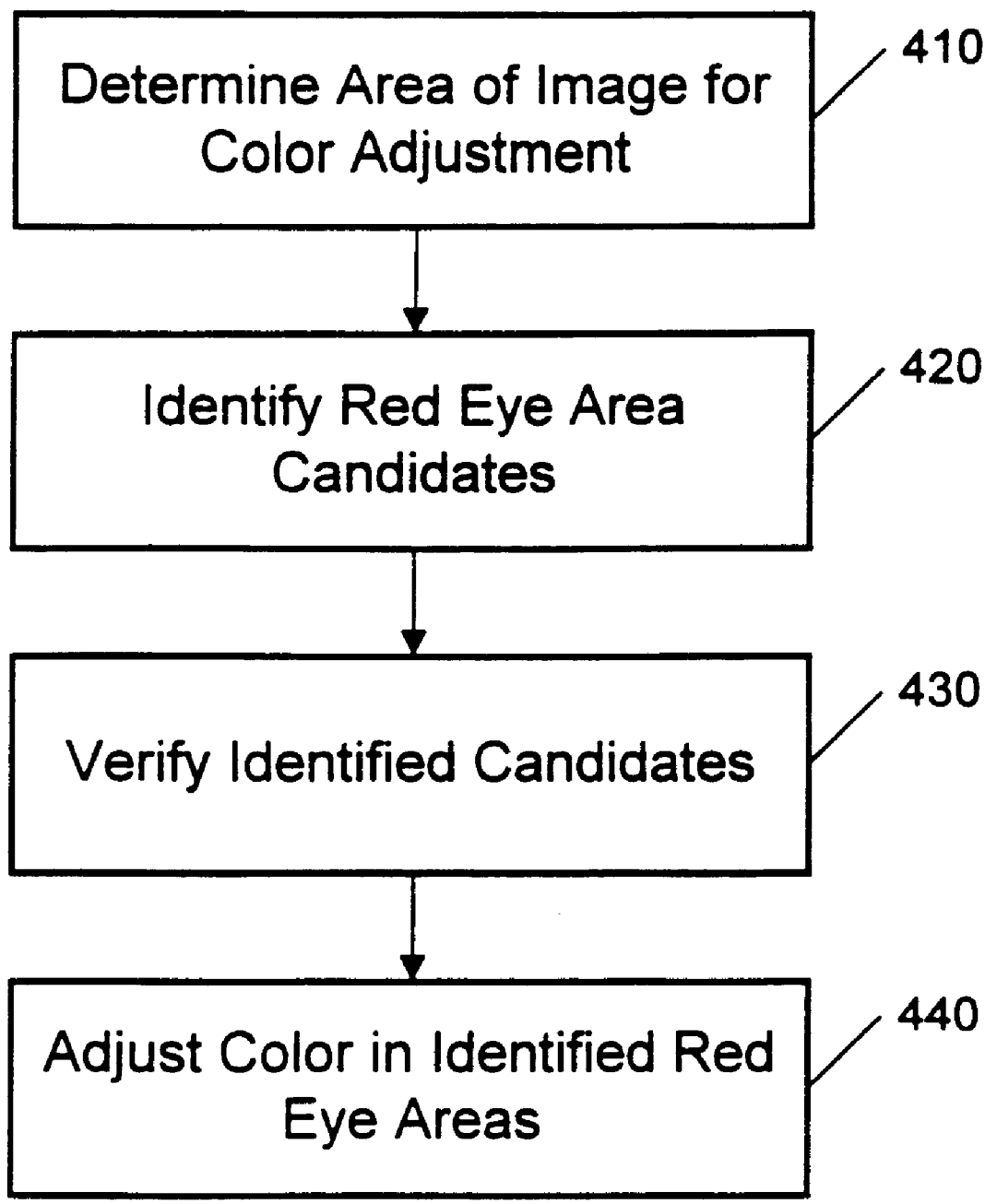
FIG. 4 is a flow diagram of a method for adjusting color to minimize the red eye effect in a digital image in accordance with the present invention.

Referring to FIG. 4, a user selects an area in a digital image for color adjustment (step 410). The area selected may enclose just a single eye, two or more eyes, or the entire digital image. Area selection may be implemented using various methods, such as by providing a user interface that allows the user to define the vertices or edges of a rectangle.

Figure 5:
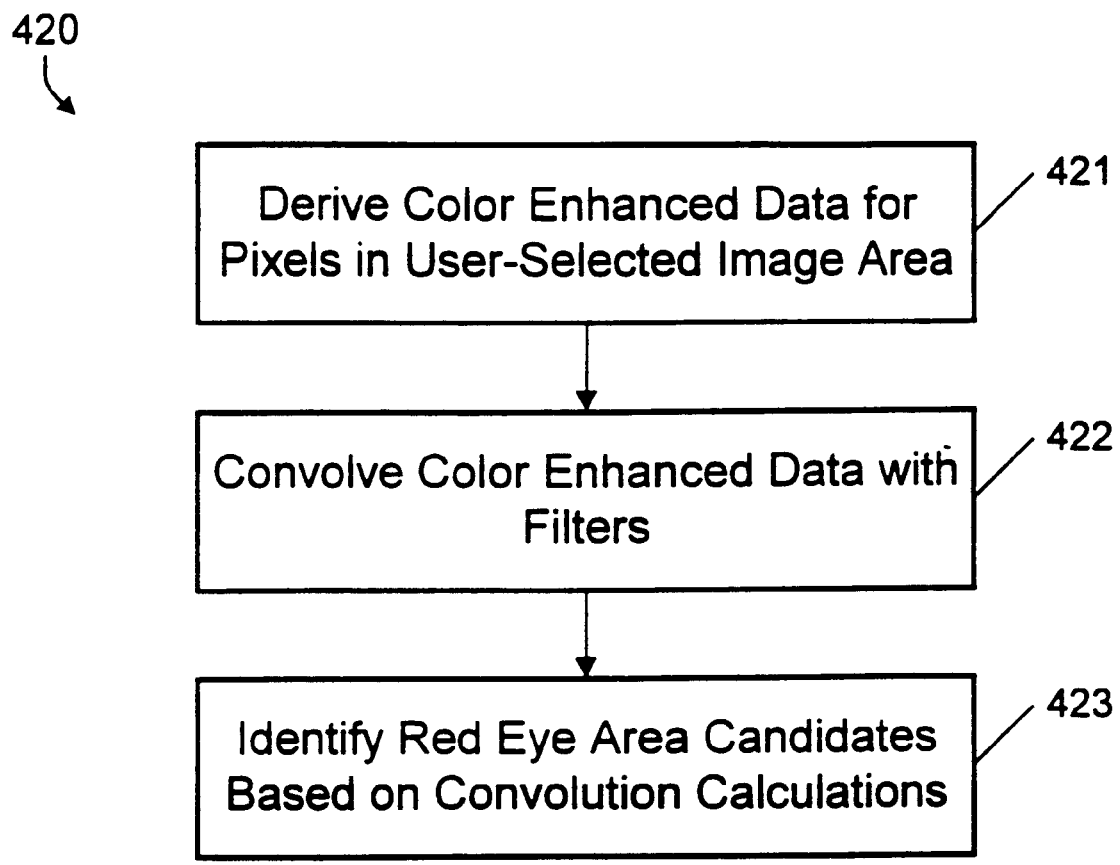
FIG. 5 is a flow diagram of a method for identifying red eye area candidates in a digital image in accordance with the present invention.

Candidate areas within the user-selected area of the image are then automatically identified (step 420). Various identification methods may be used. Referring to FIG. 5, one method to identify the red eye effect is to color enhance the user-selected area of the digital image to more clearly distinguish pixels having specific color characteristics (step 421). To identify the red eye effect, the color red may be enhanced in the image to more easily identify red circular areas 220.

Various color enhancement methods may be used. If the digital image is defined using the RGB color system, the color data for each pixel includes values r, g, and b, respectively representing red, green, and blue components for the pixel. A method of red enhancement may assign a value to each pixel in the selected area based on the relative intensity of its red component.

For example, a pixel having a red color will have a greater value for its red component r than for either of its green g or blue b components, and thus may be identified if its color data satisfies the relations $r > k_1 g$ and $r > k_2 b$, where $k_1$ and $k_2$ are predetermined constants. If a pixel does not satisfy these relations, the pixel color is determined not to be red, and a red-enhanced value $c_r$ of 0 is assigned to the pixel.

On the other hand, a pixel satisfying the equations is determined to be red, and a red-enhanced value $c_r$ may be calculated as follows:

$$c_r = \frac{(r-g) + (r-b)}{3 * (r + g + b + \text{avg. intensity})}$$

where avg. intensity represents the average intensity of the pixels of the user-selected area, calculated as the average sum of the r, g, and b components of each pixel of the area. This formula may be modified as desired.

Figure 6:
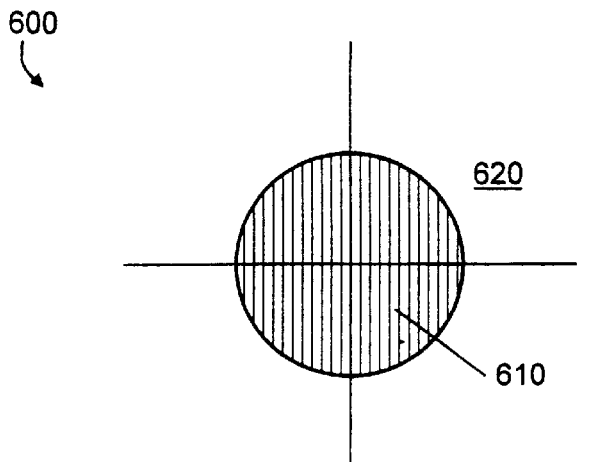
FIGS. 6–8 illustrate filters used in accordance with the present invention to identify red eye area candidates in a digital image.

Based on the red-enhanced values $c_r$, candidate areas that may exhibit the red eye effect are identified. Again, various methods may be used. One method calculates convolutions of the red-enhanced image data with a filter (step 422 of FIG. 5) such as that illustrated in FIG. 6. The filter 600 consists of data bits corresponding to pixels of the user-selected image area, where data bits of the filter area 610 are assigned a value of 1 and data bits in the surrounding area 620 are assigned a value of 0.

In general, the size, location, and number of areas in the image affected by the red eye effect are unknown. For this reason, filters of varying sizes are tested within the user selected area of the digital image. Using a filter such as that illustrated in FIG. 6, convolutions are calculated as dot products between the various filters and the red-enhanced image data. The dot product indicates the correspondence between the filter and image pixels identified as having a red color (non-zero red-enhanced image data).

Referring again to FIG. 5, candidates for red eye areas are identified based on the convolution calculations (step 423). Various tests may be used. For example, a test may determine that a red eye area candidate is identified when the convolution calculation exceeds a predetermined threshold. Another test may determine that a red eye candidate is identified when the convolution calculation is maximized across the various filter sizes and positions.

Alternatively, steps 421–423 of FIG. 4 may be modified to identify not only red circular areas (220 in FIG. 2), but red circular areas 220 with non-red backgrounds 210.

For example, pixels in areas corresponding to the non-red background 210 typically have a weak color, such as black, white, a shade of grey, brown or a light blue or green. Represented in RGB, weak colors have similar values for each of the red, green, and blue color components, and pixels having weak colors may be distinguished from pixels having strong colors by deriving another set of color enhanced data (step 421 of FIG. 4) for the image. For example, pixels may be assigned a color enhanced value $c_w$ as follows:

$$c_w = \frac{|(r-g) + (r-b) + (g-b)|}{3 * (r + g + b + \text{avg. intensity})}$$

where avg. intensity is calculated as explained above. Thus, $c_w$ has relatively large values for pixels of strong color, and relatively small values for pixels of weak color.

Figure 7:
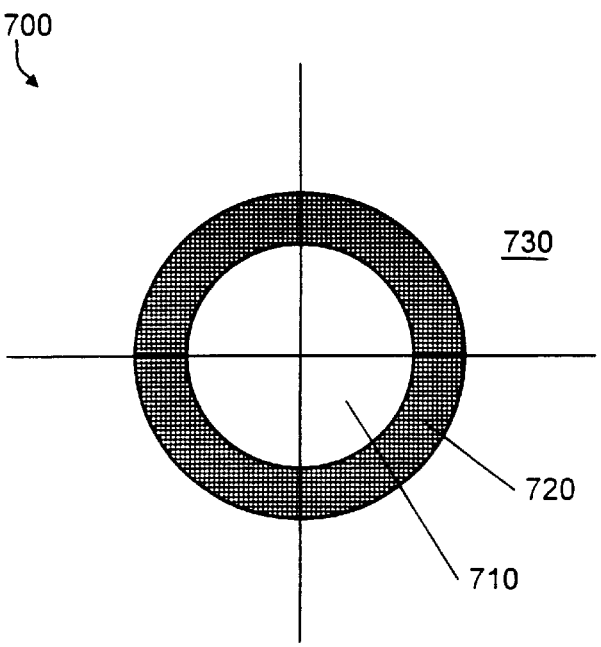

The dot product of the weak-color enhanced color data and a ring shaped filter 700 such as that illustrated in FIG. 7, where data bits of areas corresponding to the ring 720 have a value of −1 and in other areas 710, 730 have a value of 0, produces a value with a small negative value when the filter area 720 corresponds to areas in the image having a weak color, and a larger negative value when the filter area 720 corresponds to areas in the image having stronger color. As with the filter 600 of FIG. 6, dot products are calculated using filters 700 of different sizes and positions.

Figure 8:
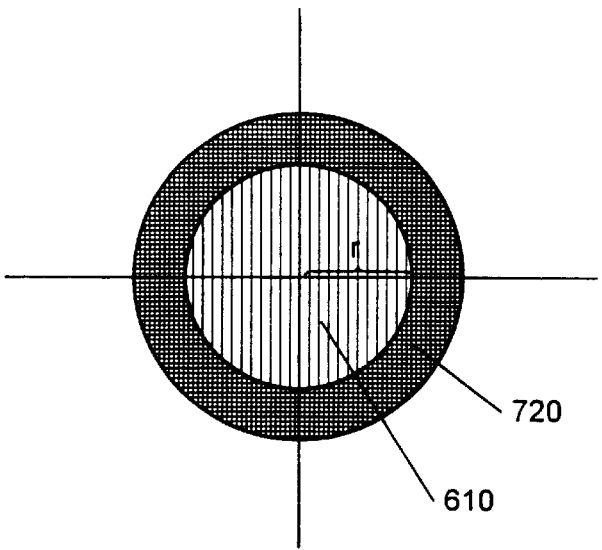

To identify areas in the image having a red circular area 220 surrounded by a weakly colored background 210, a convolution can be calculated as the sum of two dot products: (1) the dot product of the red enhanced color data for the image with the circular filter of FIG. 6; and (2) the dot product of the weak-color enhanced color data for the image with the ring shaped filter of FIG. 7. Recalling that a red eye portion includes a red eye ring 220 surrounded by a weak colored area 210, the convolution is calculated with filters having corresponding sizes and positions. Specifically, as shown in FIG. 8, for a circular filter area 610 having a radius of r, ring shaped filter area 720 has an inner radius of r and is positioned with the circular filter area 610 at its center.

Again, various tests may be used to determine whether the convolution identifies a possible red eye area candidate. For example, candidates may be determined based on whether their convolution calculation is maximized or exceeds a predetermined threshold.

Returning again to FIG. 4, once a red eye area candidate is identified based on the convolution data (step 420), an additional interactive test may be optionally provided to allow the user to verify whether the identified red eye area candidate actually corresponds to a red eye area (step 430). For example, when a convolution calculation for specific filters exceeds a predetermined threshold, a user interface may be implemented to highlight the area of the digital image corresponding to the area identified by the circular filter of FIG. 6, and may display a dialog box asking the user to confirm whether the indicated area exhibits the red eye effect.

Once a red eye area is identified (and optionally verified) (steps 420 and 430), the color data for pixels within that area are evaluated and adjusted to reduce the red eye effect (step 440).

Figure 9:
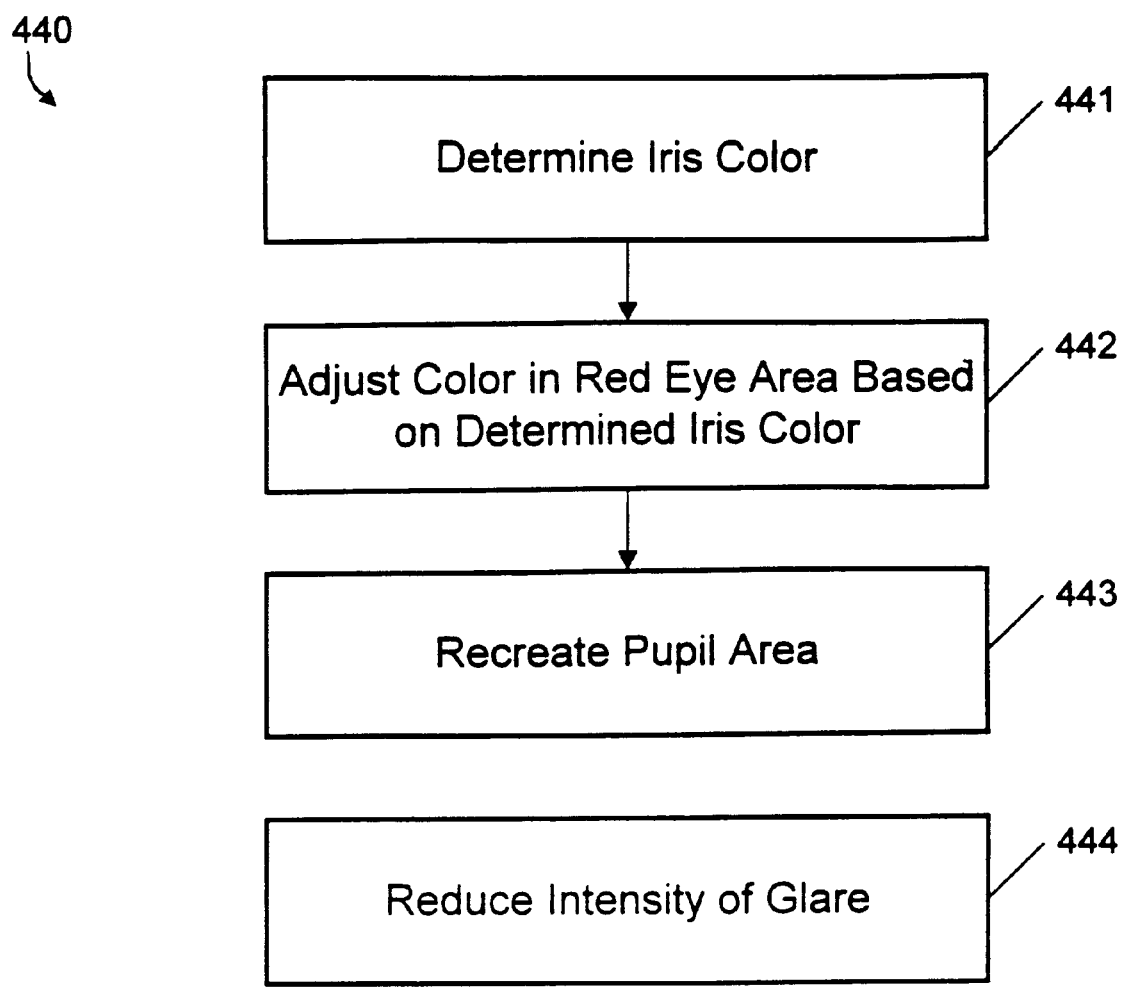
FIG. 9 is a flow diagram of a method for adjusting color in identified red eye areas in a digital image in accordance with the present invention.

The specific method by which the pixel data is altered may be varied. For example, referring to FIG. 9, the natural color of the iris may be determined (step 441) and the pixels affected by the red eye effect modified to reduce the redness by altering their color data based on the determined iris color (step 442).

As shown in FIG. 2, in some cases, the iris 210 surrounds the red eye circular area 220. Thus, original color data of the image (not the color enhanced data of the image) of pixels within an area immediately surrounding the red eye area identified in steps 420 and 430 of FIG. 4 may be evaluated to determine the average ratio of r:g and r:b for the iris color (step 441 of FIG. 9). Original color data of each pixel in the red eye area is next identified, and if a pixel's color is identified as red (having a strong red component r), new values r', g', and b' are calculated (step 442) to approximate the ratios calculated for the iris color (step 441).

One method for adjusting the color determines new values r', g', and b' that reduce the overall intensity (which is typically disproportionately large in the red eye area) and approximates the ratios of the color components of the iris color by solving the following set of equations:

$$r+g+b=k\ (r'+g'+b')$$
$$r:g=r':g'$$
$$r:b=r':b'$$

where k is a constant less than one.

In some cases, however, the red eye circular area 220 may obscure most or all of the iris area 210, such that there are not enough iris colored pixels to properly identify the iris color. In such a case, the iris color used to replace the color data for red pixels in the identified red eye area (step 442 of FIG. 9) may be a default color. For example, because the red eye effect occurs most frequently with light colored eyes, a light blue or grey color may be used. Alternatively, a user interface may be provided to allow a user to set a default color. As another alternative, the user interface may be provided to identify instances where the iris color is not identifiable and to allow the user to specify an iris color for the specific instance. The user may specify a color by, for example, selecting or mixing colors from a displayed palette or selecting the color of a displayed pixel.

As discussed above and as illustrated in FIG. 2, the red eye effect typically obscures the pupil area 100 (FIG. 1). Thus, the pupil area is recreated (step 443 of FIG. 9) by assigning color data for a blackish color to pixels in the identified red eye area. The specific size and location of the recreated pupil area may vary. For example, the pupil may be created as a circular area centered in the recreated iris area, having a diameter that is one-third of the diameter of the recreated iris. A more complex approach calculates the overall average brightness of pixels in the image, and creates the pupil such that its size reflects the average amount of light detected in the image scene.

An additional feature common to the red eye effect is the white circular glare 230, shown in FIG. 2. Completely eliminating the glare can give an artificial appearance to the image, but it may be aesthetically desirable to reduce the intensity of the glare area (step 444 of FIG. 9). In the RGB system, pixels in the glare area are identifiable by positions within the identified red eye area having high r, g, and b values. The color data for such pixels may be modified using various methods, such as by reducing the intensity of the r, g, and b values, or by replacing the color data with predetermined values r', g', and b' for a white color of moderate intensity.

Referring again to FIG. 4, when the red eye adjustment is complete (step 440), steps 420, 430 and 440 may be repeated until the entire selected area (step 410) is evaluated using the range of filter sizes and positions. If desired, termination conditions may be provided. For example, the invention may be implemented to identify only a predetermined number of areas for color adjustment, where the predetermined number may be default number, or a number specified by the user when selecting the area in step 410.

Other embodiments are within the scope of the following claims. The invention may be implemented to adjust color data for other recognizable features. For example, photocopies of three-hole-punched paper have dark circles in the locations of the holes. The invention may be implemented to identify pixels comprising such circles and to adjust the color data for those pixels.

Although the invention has been described for color data represented in the RGB color system, the invention may be implemented for use with other color systems as well.

Various filters and convolution functions may be provided as needed. For example, the filters of FIGS. 6 and 7 may be used in combination or alone to identify the red eye portion. Additionally, additional color enhancement may be performed and the convolution may consider an extra filter to identify the white circular glare in the center of a red eye ring. For identifiable effects other than the red eye effect, filters and convolution functions may be provided as needed.

What is claimed is:

1. A method for adjusting color values of pixels of an image to reduce a red-eye effect, the method comprising:
   generating a red-enhanced value for each pixel in the image, wherein the red-enhanced value of a pixel represents the degree of redness of the pixel;
   convolving a plurality of spatial filters with the red-enhanced values to create one or more red filter values, each of the one or more red filter values corresponding to a pixel region having a specific shape and size;
   identifying a pixel region having a shape and size defined by at least one of the plurality of spatial filters as a red-eye pixel region if the corresponding red filter value exceeds a predetermined threshold; and
   adjusting the color values of the red-eye pixel region to reduce the red-eye effect.

2. The method of claim 1, wherein generating a red-enhanced value for each pixel comprises:
   categorizing each pixel in the image as a non-red pixel or a red pixel;
   assigning a minimum red-enhanced value to each non-red pixel; and
   calculating a red-enhanced value for each red pixel, wherein the red-enhanced value represents a degree of redness of the pixel.

3. The method of claim 2, wherein the color values of the pixels of the image comprise the values for red, green and blue components, and wherein:
   each pixel having a red component value exceeding both the green component value and the blue component value by first and second predetermined thresholds, respectively, is categorized as a red pixel; and each remaining pixel is categorized a non-red pixel.

4. The method of claim 1, wherein the image is a portion of an original image.

5. The method of claim 4, wherein the image is a user-selected portion of the original image.

6. The method of claim 1, wherein adjusting the color values comprises:

identifying pixels in the image corresponding to an iris area of an eye affected by the red-eye effect;

determining a color value of the iris pixels; and adjusting the color value of each red-eye pixel to approach the color value of the iris pixels.

7. The method of claim 6, wherein determining the color value of the iris pixels comprises using a color value of a default color.

8. The method of claim 7, wherein the default color is selected by a user.

9. A method for identifying a red-eye area in an image, comprising:

generating a red-enhanced value for each pixel in the image;

generating a weak-color-enhanced value for each pixel in the image;

convolving an inner filter with the red-enhanced values to create a red filter value corresponding to a pixel region having a specific shape and size defined by the inner filter;

convolving an outer spatial filter with the weak-color-enhanced values to create a weak-color filter value corresponding to a pixel region having a specific shape and size defined by the outer filter; and identifying a red-eye area having a shape and size defined by at least one of the inner filter and the outer filter using both the red-enhanced values and the weak-color-enhanced values of the pixels.

10. The method of claim 9, wherein identifying a red-eye area comprises:

identifying as a red-eye area an area of the image having a ring-shaped region of weak-color-background pixels surrounding a circular-shaped region of red-eye pixels.

11. The method of claim 10, further comprising:

convolving a plurality of ring-shaped outer filters with the weak-color-enhanced values to create one or more ring filter values, each of the one or more ring filter values corresponding to a pixel region having a specific size and shape;

convolving a plurality of circular-shaped inner filters with the red-enhanced values to create one or more red filter values, each of the one or more red filter values corresponding to a pixel region having a specific size and shape; and using the ring filter values and the red filter values to identify a red-eye area in the image.

12. A computer program product stored on a machine-readable medium for adjusting color values of pixels of an image to reduce a red-eye effect, the product comprising instructions operable to cause a programmable processor to:

generate a red-enhanced value for each pixel in the image, wherein the red-enhanced value of a pixel represents the degree of redness of the pixel;

convolve a plurality of spatial filters with the red-enhanced values to create one or more red filter values, each of the one or more red filter values corresponding to a pixel region having a specific shape and size;

identify a pixel region having a shape and size defined by at least one of the plurality of spatial filters as a red-eye pixel region if the corresponding red filter value exceeds a predetermined threshold; and adjusting the color values of the red-eye region to reduce the red-eye effect.

13. The product of claim 12, wherein generating a red-enhanced value for each pixel comprises:

categorizing each pixel in the image as a non-red pixel or a red pixel;

assigning a minimum red-enhanced value to each non-red pixel; and calculating a red-enhanced value for each red pixel, wherein the red-enhanced value represents a degree of redness of the pixel.

14. The product of claim 13, wherein the color values comprise values for red, green and blue components, and wherein:

each pixel having a red component value exceeding both the green component value and the blue component value by first and second predetermined thresholds, respectively, is categorized as a red pixel; and each remaining pixel is categorized a non-red pixel.

15. The product of claim 12, wherein the image is a portion of an original image.

16. The product of claim 15, wherein the image is a user-selected portion of the original image.

17. The product of claim 12, wherein adjusting the color values comprises:

identifying pixels in the image corresponding to an iris area of an eye affected by the red-eye effect;

determining a color value of the iris pixels; and adjusting the color value of each red-eye pixel to approach the color value of the iris pixels.

18. The product of claim 17, wherein determining the color value of the iris pixels comprises using a color value of a default color.

19. The product of claim 18, wherein the default color is selected by a user.

20. A computer program product stored on a machine-readable medium for identifying a red-eye area in an image, the product comprising instructions operable to cause a programmable processor to:

generate a red-enhanced value for each pixel in the image;

generate a weak-color-enhanced value for each pixel in the image;

convolve an inner filter with the red-enhanced values to create a red filter value corresponding to a pixel region having a specific shape and size defined by the inner filter;

convolve an outer spatial filter with the weak-color-enhanced values to create a weak-color filter value corresponding to a pixel region having a specific shape and size defined by the outer filter; and identify a red-eye area having a shape and size defined by at least one of the inner filter and the outer filter using both the red-enhanced values and the weak-color-enhanced values of the pixels.

21. The product of claim 20, wherein identifying a red-eye area comprises:

identifying as a red-eye area an area of the image having a ring-shaped region of weak-color-background pixels surrounding a circular-shaped region of red-eye pixels.

22. The product of claim 21, further comprising instructions operable to cause a programmable processor to:

convolve a plurality of ring-shaped outer filters with the weak-color-enhanced values to create one or more ring filter values, each of the one or more ring filter values corresponding to a pixel region having a specific size and shape;

convolve a plurality of circular-shaped inner filters with the red-enhanced values to create one or more red filter values, each of the one or more red filter values corresponding to a pixel region having a specific size and shape; and use the ring filter values and the red filter values to identify a red-eye area in the image.

\* \* \* \* \*

UNITED STATES PATENT AND TRADEMARK OFFICE
CERTIFICATE OF CORRECTION

PATENT NO.     : 6,204,858 B1
DATED          : March 20, 2001
INVENTOR(S)    : Naresh C. Gupta It is certified that error appears in the above-identified patent and that said Letters Patent is hereby corrected as shown below:

<u>Title page,</u>
Item [56], References Cited, U.S. PATENT DOCUMENTS, please insert the following document:
-- 5,233,374      8/1993  Kanai et al. ................................... 354/400 --

<u>Column 8,</u>
Line 7, please insert -- pixel -- between "the red-eye" and "region".

Signed and Sealed this

Thirteenth Day of August, 2002

Attest:

Attesting Officer

JAMES E. ROGAN
*Director of the United States Patent and Trademark Office*